United States Patent
Hara et al.

(10) Patent No.: US 10,106,241 B2
(45) Date of Patent: Oct. 23, 2018

(54) AIRCRAFT AND FUSELAGE COOLING STRUCTURE

(71) Applicant: MITSUBISHI AIRCRAFT CORPORATION, Aichi (JP)

(72) Inventors: Nobuhide Hara, Tokyo (JP); Osamu Yamada, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 387 days.

(21) Appl. No.: 14/962,748

(22) Filed: Dec. 8, 2015

(65) Prior Publication Data

US 2016/0207606 A1 Jul. 21, 2016

(30) Foreign Application Priority Data

Jan. 21, 2015 (JP) .................................. 2015-9164

(51) Int. Cl.
*B64C 1/38* (2006.01)
*B64C 7/00* (2006.01)
*B64D 13/00* (2006.01)

(52) U.S. Cl.
CPC .................. *B64C 1/38* (2013.01); *B64C 7/00* (2013.01); *B64D 13/00* (2013.01); *Y02T 50/56* (2013.01)

(58) Field of Classification Search
CPC .................... B64D 13/00; B64D 13/06; B64D 2013/0618; B64D 13/08; B64D 13/02; B64D 2013/0688; B64D 15/04; B64D 2013/003; B64D 2013/0603; B64D 15/02; Y02T 50/56; B64C 7/00; B64C 1/38
See application file for complete search history.

(56) References Cited

U.S. PATENT DOCUMENTS

| | | | |
|---|---|---|---|
| 3,740,905 A * | 6/1973 | Adams | B64C 1/067 165/231 |
| 3,867,244 A * | 2/1975 | Adams | B64C 1/067 428/182 |
| 4,804,571 A * | 2/1989 | Jouffreau | B64G 1/58 244/117 A |
| 4,919,366 A * | 4/1990 | Cormier | B64C 1/38 220/592.21 |
| 5,137,230 A | 8/1992 | Coffinberry | |
| 6,491,254 B1 * | 12/2002 | Walkinshaw | A62C 3/08 244/118.5 |
| 8,007,620 B2 * | 8/2011 | Cushing | B32B 27/04 156/245 |

(Continued)

FOREIGN PATENT DOCUMENTS

| | | |
|---|---|---|
| JP | 05-163963 A | 6/1993 |
| JP | 2004-268617 A | 9/2004 |
| JP | 2007-517713 A | 7/2007 |

*Primary Examiner* — Assres H Woldemaryam
(74) *Attorney, Agent, or Firm* — Pearne & Gordon LLP

(57) ABSTRACT

Under constraints on the space and the weight of an aircraft, the present invention aims to protect structural members from a heat generation part. An aircraft includes: a fuselage; an air conditioning pack installed on the outside of a lower part of the fuselage; a fairing covering the air conditioning pack; an outer heat insulation material disposed in a region of the fuselage, which corresponds to the air conditioning pack, from the outside of the fuselage; and an inner heat insulation material disposed around the region on the inside of the fuselage.

17 Claims, 7 Drawing Sheets

(56) References Cited

U.S. PATENT DOCUMENTS

| | | | |
|---|---|---|---|
| 2005/0211839 A1* | 9/2005 | Movsesian | B64C 1/40 244/119 |
| 2006/0284014 A1 | 12/2006 | Muller et al. | |
| 2007/0125908 A1* | 6/2007 | Eichholz | B64C 1/18 244/118.1 |
| 2009/0308975 A1* | 12/2009 | MacGregor | B64C 1/066 244/119 |
| 2011/0009042 A1* | 1/2011 | Joern | B64C 1/067 454/71 |
| 2011/0186263 A1* | 8/2011 | Piesker | B64D 13/00 165/47 |
| 2013/0298956 A1* | 11/2013 | Hiller | B64D 41/00 136/212 |

* cited by examiner

AIRCRAFT AND FUSELAGE COOLING STRUCTURE

BACKGROUND OF THE INVENTION

Field of the Invention

The present invention relates to a structure for protecting structural members located near a heat generation part of an aircraft from heat.

Description of the Related Art

Aircraft are equipped with an air conditioning system which serves to cool and heat, ventilate, and pressurize the cabin etc. This air conditioning system is composed of a compressor, a heat exchanger, a turbine, etc. (e.g., Japanese Patent Laid-Open No. 2004-268617).

Of the components of the air conditioning system of an aircraft, a component which controls temperature and pressure using bleed air taken out from an engine or an auxiliary power unit and air taken in from the outside is installed on the outside of the fuselage. This component (air conditioning pack) is described in Japanese Patent Laid-Open No. 5-163963, for example.

The air conditioning pack includes a control valve which controls the flow rate of bleed air, a turbocompressor which compresses bleed air, etc., and generates heat as it operates.

If the air conditioning pack is installed close to a lower part of the fuselage, heat generated from the air conditioning pack propagates to the lower part of the fuselage facing the air conditioning pack, causing a local temperature rise in the lower part of the fuselage. However, this heat is not released from the lower part of the fuselage to the inside of the fuselage, since a heat insulation material is provided on the inside of the fuselage.

The heat insulation material is provided over the entire inside of an outer shell (the fuselage and the pressure partition wall) which forms a pressurized compartment (e.g., National Publication of International Patent Application No. 2007-517713).

Accordingly, the heat generated from the air conditioning pack is released to the lower part of the fuselage and the surface of the fairing through radiation and convection toward the space between the lower part of the fuselage and the belly fairing. For this reason, it makes sense to increase the heat release area by forming the fairing in a larger size so as to be separated from the lower part of the fuselage, and to dispose the air conditioning pack at a lower position so as to be farther away from the fuselage. However, the increased size of the fairing adds to the weight of the airframe. Consequently, the fuel efficiency deteriorates.

Therefore, under constraints on the space and the weight of an aircraft, the present invention aims to protect the structural members from the heat generation part.

SUMMARY OF THE INVENTION

An aircraft of the present invention includes: a fuselage; a heat generation part installed on the outside of the fuselage; a fairing covering the heat generation part; an outer heat insulation material disposed in a corresponding region of the fuselage, which corresponds to the heat generation part, from the outside of the fuselage; and an inner heat insulation material disposed around the corresponding region on the inside of the fuselage.

It is preferable that the aircraft of the present invention includes an air conditioning system, and that air conditioned by the air conditioning system is present in a space further on the inside than the corresponding region.

In the aircraft of the present invention, it is preferable that the corresponding region is exposed toward the inside of the fuselage.

In the aircraft of the present invention, it is preferable that the inner heat insulation material and the outer heat insulation material are disposed so as to together cover the entire circumference of the fuselage without interruption.

In the aircraft of the present invention, it is preferable that end edges of the inner heat insulation material and the outer heat insulation material overlap each other.

In the aircraft of the present invention, it is preferable that the end edges of the inner heat insulation material which are adjacent to the corresponding region are rising gently in a thickness direction of the inner heat insulation material.

In the aircraft of the present invention, it is preferable that a flow of air is supplied from the inside of the fuselage toward the corresponding region.

In the aircraft of the present invention, it is preferable that a flow of air is supplied to a space between the fuselage and the fairing.

In the aircraft of the present invention, it is preferable that the surface area of the corresponding region in contact with air on the inside of the fuselage is increased by a protrusion formed in the corresponding region.

In the aircraft of the present invention, it is preferable that the outer heat insulation material is fitted on an outer circumferential part of the fuselage through a hook-and-loop fastener having hooks and loops engaging with each other.

A fuselage cooling structure of an aircraft of the present invention includes: an outer heat insulation material disposed, from the outside of a fuselage, in a corresponding region of the fuselage which corresponds to a heat generation part installed on the outside of the fuselage and covered with a fairing; and an inner heat insulation material disposed around the corresponding region on the inside of the fuselage.

According to the present invention, heat propagating from the heat generation part to the corresponding region of the fuselage is blocked by the outer heat insulation material, and the heat is released from the corresponding region, where the inner heat insulation material is not disposed, to the inside of the fuselage, so that a local temperature rise of the fuselage can be suppressed.

DETAILED DESCRIPTION OF THE PREFERRED EMBODIMENTS

In the following, embodiments of the present invention will be described with reference to the accompanying drawings.

Figure 1:
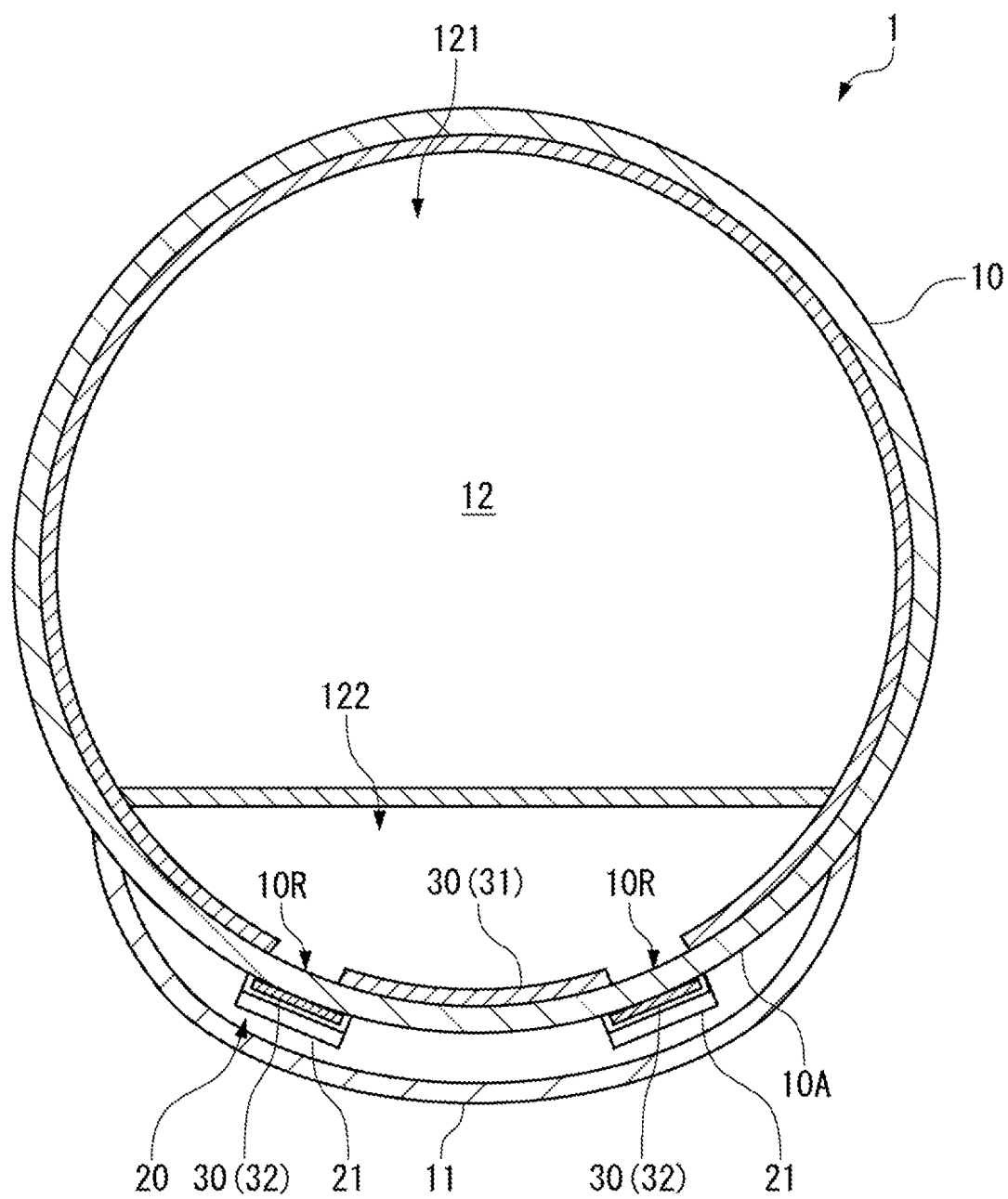
FIG. 1 is a lateral cross-sectional view of a fuselage of an aircraft according to a first embodiment.

An aircraft 1 shown in FIG. 1 includes a fuselage 10, main wings (not shown) provided on the left and right of the fuselage 10, and a fairing 11 (belly faring) which covers a joint part between the fuselage 10 and the main wings and accessories installed in a lower part 10A of the fuselage 10.

While not specifically shown, the fuselage 10 formed in a substantially cylindrical shape includes annular frames, skins supported by the frames, and stringers provided on the rear side of the skins.

On the inside of the fuselage 10, a pressurized compartment 12 which is a cabin, a cockpit, a cargo compartment, etc. is defined.

Pressurization, cooling and heating, and ventilation of the pressurized compartment 12 are performed by an air conditioning system 20 installed in the aircraft 1.

Air conditioning packs 21 of the air conditioning system 20 are installed in the lower part 10A of the fuselage 10.

The air conditioning system 20 and the air conditioning pack 21 are also called an environmental control system (ECS) and an ECS pack, respectively.

The air conditioning system 20 has two systems to secure redundancy. The air conditioning pack 21 corresponding to one system is provided on the left side of the lower part 10A, and the air conditioning pack 21 corresponding to the other system is provided on the right side of the lower part 10A.

Figure 2A:
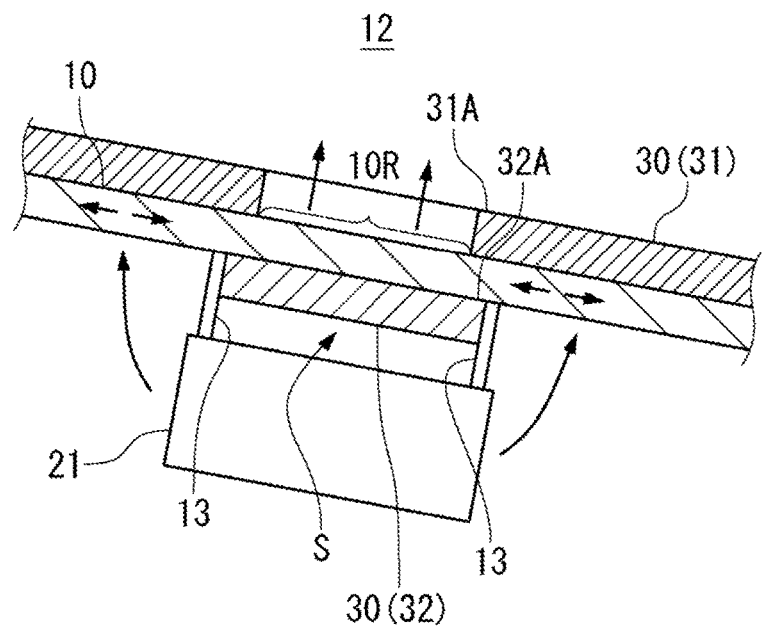
FIG. 2A is a cross-sectional view showing an air conditioning pack and a fuselage cooling structure.

The air conditioning packs 21 are suspended from the fuselage 10 through support members 13 (FIG. 2A). The air conditioning packs 21 are close to the lower part 10A of the fuselage 10.

The fairing 11 covers a predetermined area of the lower part 10A of the fuselage 10 and straightens airflows. The fairing 11 is formed so as to extend along the lower part 10A of the fuselage 10 while leaving a volume required for disposing the accessories between the fairing 11 and the fuselage 10. Thus, air resistance of the aircraft 1 is reduced, and the fuel cost is saved accordingly.

The accessories including the air conditioning packs 21 are disposed in the narrow space between the fairing 11 and the fuselage 10.

The air conditioning system 20 performs cooling and heating, ventilation, and pressurization of the pressurized compartment 12 by controlling temperature and pressure by means of the air conditioning packs 21 using bleed air taken out from an engine provided in the main wing, or bleed air taken out from an auxiliary power unit provided in a rear part of the fuselage 10, and external air taken in from the outside of the aircraft.

The air conditioning system 20 includes a plurality of heat exchangers, a dehumidifier, etc. (not shown) other than the air conditioning packs 21.

To simply put, the air conditioning pack 21 is composed of a flow valve which adjusts the flow rate of bleed air, a compressor which compresses bleed air, a turbine which adiabatically expands compressed air, etc., and these components are packaged inside a casing. The compressor and the turbine of the air conditioning pack 21, along with a predetermined heat exchanger, constitute an air cycle.

The air conditioning pack 21 generates heat according to pressure loss in the flow valve and operation of the compressor. When this heat propagates to the fuselage 10 through radiation (emission), convection, and conduction, a local temperature rise is likely to occur especially in a region 10R of the fuselage 10 which corresponds to the air conditioning pack 21. To prevent the temperature of the region 10R from exceeding an allowable temperature specified for the fuselage 10, in this embodiment, the region 10R of the fuselage 10 corresponding to the air conditioning pack 21 is cooled on the basis of the arrangement of a heat insulation material 30 provided on the fuselage 10. The heat insulation material 30 constitutes a structure for cooling the region 10R of the fuselage 10.

The region 10R of the fuselage 10 is exposed to the inside of the fuselage 10, and heat is released from the exposed surface of the region 10R. The region 10R is a region of a rectangular shape, for example, corresponding to the planar shape of the air conditioning pack 21.

As shown in FIG. 1, the fuselage 10 forming the pressurized compartment 12 is provided with the heat insulation material 30. To keep the temperature of mainly the pressurized compartment 12, it is required to provide the heat insulation material 30 without interruption along the outer shell (the fuselage 10 and a pressure partition wall) which forms the pressurized compartment 12.

The inside of the fuselage 10 is used as the cabin at the positions where the air conditioning packs 21 are installed, and the entire cabin 121 and cabin underfloor space 122 constitute the pressurized compartment 12.

The heat insulation material 30 is typically made of glasswool. The heat insulation material 30 is glasswool shaped into a sheet and covered with a metal foil. The heat insulation material 30 is not limited to this example, and it can be formed appropriately.

As shown in FIG. 1 and FIG. 2A, the heat insulation material 30 is constituted of an inner heat insulation material 31 disposed on the inside of the fuselage 10 and an outer heat insulation material 32 disposed on the outside of the fuselage 10.

The inner heat insulation material 31 is laid all over the inner circumferential part of the fuselage 10, except for the region 10R, and the pressure partition wall inside the fuselage 10. In other words, the inner heat insulation material 31 is missing only in the region 10R, and is disposed around the region 10R. The region 10R is exposed to the inside of the fuselage 10.

Here, the missing portion of the inner heat insulation material 31 may be formed by cutting out the inner heat insulation material 31 which has been initially laid all over the inner circumferential part including the region 10R, or by providing the inner heat insulation material 31, which is formed in a shape with that portion removed from the beginning, on the inner circumferential part of the fuselage 10.

The outer heat insulation material 32 is disposed over the region 10R, where the inner heat insulation material 31 is missing, along the outer circumferential part of the fuselage 10. The outer heat insulation material 32 is interposed between the region 10R and the air conditioning packs 21 which are heat generation parts. This outer heat insulation material 32 blocks propagation of heat from the air conditioning packs 21 to the region 10R, i.e., thermally insulates the region 10R.

In this embodiment, there is a clearance S (FIG. 2A) between the outer heat insulation material 32 and the air conditioning pack 21, but this clearance S is not required.

The inner heat insulation material 31 and the outer heat insulation material 32 may be equivalent or not equivalent to each other in heat insulation performance.

As described above, since the region 10R, where the inner heat insulation material 31 is missing, is provided with the outer heat insulation material 32 from the outside of the fuselage 10, when the inner heat insulation material 31 and the outer heat insulation material 32 are integrated, the heat insulation material 30 is provided continuously along the fuselage 10 forming the pressurized compartment 12.

The region 10R where the inner heat insulation material 31 is missing can be defined as a region equal to an area of the air conditioning pack 21 projected along the thickness direction of the fuselage 10. In this embodiment, the region 10R is defined over an area substantially equal to the projection area (slightly narrower than the projection area) of the air conditioning pack 21.

The outer heat insulation material 32 needs to be provided over the entire region 10R in order to secure the continuity of the heat insulation material 30 and to sufficiently block the propagation of heat from the air conditioning pack 21 to the region 10R.

From the viewpoint of thermally shielding the region 10R and securing the continuity of the heat insulation material 30, it is more preferable to form the outer heat insulation material 32 in a size larger than the region 10R so that end edges 32A of the outer heat insulation material 32 and end edges 31A of the inner heat insulation material 31 overlap each other.

The outer heat insulation material 32 can be provided on the outer circumferential part of the fuselage 10 by an appropriate method.

Figure 2B:
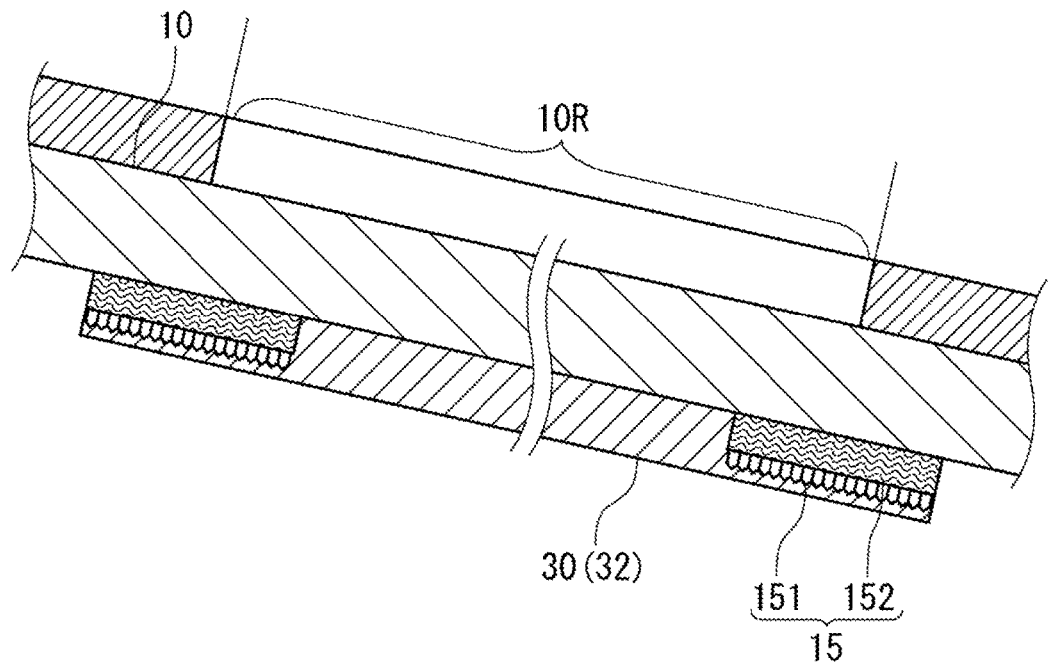
FIG. 2B is a view showing an outer heat insulation material fitted on the fuselage through a hook-and-loop fastener.

In this embodiment, as shown in FIG. 2B, the outer heat insulation material 32 is fitted on the outer circumferential part of the fuselage 10 through a hook-and-loop fastener 15.

The hook-and-loop fastener 15 includes hooks 151 and loops 152 engaging with each other.

The hooks 151 are attached on one side of the outer heat insulation material 32.

The loops 152 are attached on the outer circumferential surface of the fuselage 10.

The hooks 151 and the loops 152 can be provided in appropriate portions as required for supporting the outer heat insulation material 32 on the fuselage 10. For example, the hooks 151 can be provided in a frame-shaped region along the peripheral edges of the outer heat insulation material 32, and the loops 152 can be provided in a region of the fuselage 10 corresponding to the position of the hooks 151.

Conversely to the example shown in FIG. 2B, it is also possible to provide the hooks 151 on the fuselage 10 and provide the loops 152 on the outer heat insulation material 32.

In this embodiment, it is also acceptable to dispose one outer heat insulation material 32 in the region 10R from the outside of the fuselage 10 and then provide another outer heat insulation material 32 on the air conditioning pack 21 through the hook-and-loop fastener 15 etc.

Similarly, the inner heat insulation material 31 can be provided in the inner circumferential part of the fuselage 10 by an appropriate method. For example, the inner heat insulation material 31 can be fixed by binding it with a string etc. on the frame of the fuselage 10.

Next, the workings of the cooling structure based on the arrangement of the heat insulation material 30 will be described with reference to FIG. 2A and FIG. 1.

The temperature of the space inside the fairing 11 rises due to radiation and convection of heat from the air conditioning pack 21. Since the fairing 11 exposed to external air has a low profile and the heat release area (surface area) thereof is small, the temperature of the space inside the fairing 11 is likely to rise. Especially during parking when the temperature of external air is higher than during flight, the temperature of the space inside the fairing 11 rises significantly. The temperature rise is also significant when the aircraft 1 is a small aircraft, such as a regional jet, due to the small surface area of the fairing 11.

Then, air having a relatively high temperature on the inside of the fairing 11 stagnates along the outer circumferential part of the fuselage 10.

Heat propagating from the air conditioning pack 21 to the region 10R in a harsh heat environment as described above is blocked by the outer heat insulation material 32 disposed in the region 10R from the outside of the fuselage 10. Then, as indicated by the arrows in FIG. 2A, the heat generated from the air conditioning pack 21 is radiated from around the outer heat insulation material 32 to the outside of the fuselage 10, and further conducts along the fuselage 10 before being released from the surface of the region 10R in contact with air inside the fuselage 10. Or, the heat generated from the air conditioning pack 21 conducts to the fuselage 10 through the support members 13 and is released from the surface of the region 10R.

Here, air conditioned by the air conditioning system 20 is supplied to the inside of the fuselage 10 which is the pressurized compartment 12, and since the temperature of this air is lower than the temperature of the air inside the fairing 11, the air inside the fuselage 10 serves as a cooling heat source and the heat of the region 10R of the fuselage 10 is efficiently released to the inside of the fuselage 10.

Thus, heat is not accumulated in the region 10R of the fuselage 10, so that it is possible to maintain the region 10R under the allowable temperature and secure the strength required of the fuselage 10.

As the heat of the region 10R is released toward the inside of the fuselage 10, the heat of the air conditioning pack 21, which is the heat source, is also released.

According to this embodiment, the inner heat insulation material 31, which prevents heat release, is not disposed in the region 10R of the fuselage 10 corresponding to the air conditioning pack 21, and instead, the outer heat insulation material 32 is disposed in the region 10R along the outer circumferential part of the fuselage 10. Thus, it is possible to significantly suppress the temperature rise of the region 10R of the fuselage 10 while complying with the requirement of disposing the heat insulation material 30 without interruption along the outer shell of the pressurized compartment 12.

Therefore, the structural members of the fuselage 10 can be protected from heat even under conditions where the heat of the heat generation part disposed on the inside of the fairing 11 is not easily released due to the small surface area of the fairing 11 etc.

Moreover, according to this embodiment, it is possible to sufficiently cool the region 10R of the fuselage 10 simply by changing the form of arrangement of the heat insulation material 30, without the need for increasing the heat release area by increasing the size of the fairing 11 or for separately installing a device for cooling the air conditioning pack 21. Since the weight of the heat insulation material 30 (the inner heat insulation material 31 and the outer heat insulation material 32) in this embodiment is equal to the weight of the inner heat insulation material 31 when it is continuously disposed in the region 10R as well, the weight of the aircraft 1 does not increase and the fuel efficiency can be maintained.

If there is an accessory, other than the air conditioning packs 21, which is disposed in the space between the lower part 10A of the fuselage 10 and the fairing 11 and generates heat, it is possible to protect the structural members of the fuselage 10 from heat generated by that accessory by disposing the outer heat insulation material 32 in the portion of the fuselage 10 corresponding to the accessory, without disposing the inner heat insulation material 31 in the portion.

For the configurations of the air conditioning system 20 and the air conditioning packs 21, various publicly-known configurations can be adopted.

The pressurized compartment 12 may be pressurized by a pressurization system which is installed separately from the air conditioning system 20.

As long as the heat of the region 10R is released toward the inside of the fuselage 10, it is acceptable to dispose some member in the region 10R from the inside of the fuselage 10. One example of such a member is a film which protects the region 10R.

That is, it is not required that the region 10R is exposed to the inside of the fuselage 10.

Figure 3:
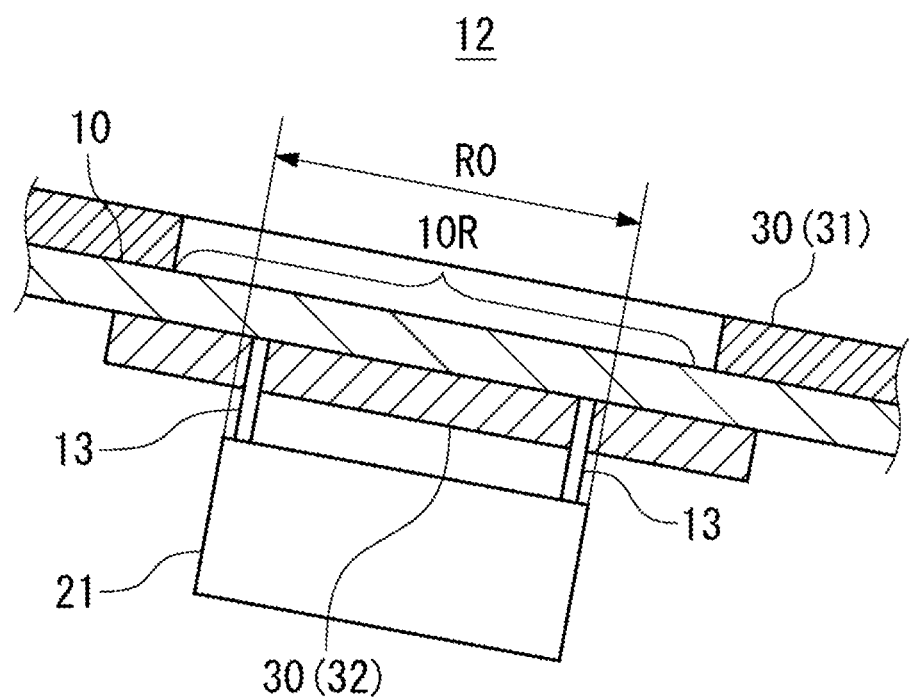
FIG. 3 is a cross-sectional view showing a modified example of the first embodiment.

As shown in FIG. 3, it is also possible to define the region 10R of the fuselage 10 over a region larger than an area RO of the air conditioning pack 21 projected along the thickness direction of the fuselage 10, and dispose the outer heat insulation material 32 over the region 10R. Then, heat spreading from the air conditioning pack 21 to the surrounding area can be blocked by the outer heat insulation material 32, as well as the heat release area of the region 10R can be secured.

An example of laying work of the heat insulation material 30 of this embodiment will be described.

First, the inner heat insulation material 31 is installed over the entire inner circumferential part of the fuselage 10 which forms the pressurized compartment 12 inside the fuselage 10. Then, the region of the inner heat insulation material 31 which corresponds to the air conditioning pack 21, already installed or to be installed in the lower part 10A of the fuselage 10, is cut out so as to expose the inner circumferential part of the fuselage 10.

Next, to dispose the outer heat insulation material 32 in the exposed region 10R of the fuselage 10 from the outside of the fuselage 10, the hooks 151 and the loops 152 of the hook-and-loop fastener 15 are attached to the outer heat insulation material 32 and the fuselage 10, respectively.

Then, as the hooks 151 of the outer heat insulation material 32 are engaged with the loops 152 of the fuselage 10, the outer heat insulation material 32 is fitted along the outer circumferential part of the fuselage 10.

In the above procedure of the laying work, it is also acceptable to provide the cut-out portion of the inner heat insulation material 31 as is on the outside of the fuselage 10 as the outer heat insulation material 32.

Using the hook-and-loop fastener 15 for installation of the outer heat insulation material 32, one can install the outer heat insulation material 32 in a suitable place by attaching the loops 152 of the hook-and-loop fastener 15 at an arbitrary position in the outer circumferential part of the fuselage 10, without considering the location of the member on which the outer heat insulation material 32 is bound with a string.

If the outer heat insulation material 32 is removably fitted through the hook-and-loop fastener 15, it is easy to adjust the position of the outer heat insulation material 32 or replace the outer heat insulation material 32 during maintenance. The procedure of the laying work is not restricted, as it is possible, for example, to install the outer heat insulation material 32 in advance in the outer circumferential part of the fuselage 10, remove the outer heat insulation material 32 as necessary from the fuselage 10 when installing the air conditioning pack 21 on the fuselage 10, and return the outer heat insulation material 32 to the fuselage 10 after cutting away a portion thereof interfering with the support member 13.

Second Embodiment

Next, a second embodiment of the present invention will be described with reference to FIG. 4.

In the second and subsequent embodiments, differences from the first embodiment will be mainly described. The same components as with the first embodiment are given the same reference signs.

Figure 4A:
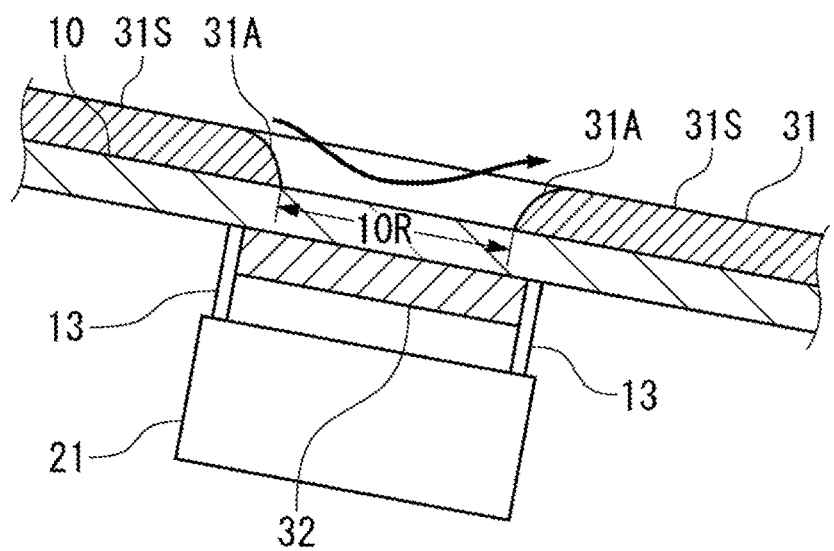
FIG. 4A is a cross-sectional view showing a cooling structure in a second embodiment.

As shown in FIG. 4A, in the second embodiment, the end edges 31A of the inner heat insulation material 31 which are adjacent to the region 10R are smoothly formed so that air flows smoothly around the region 10R of the fuselage 10 exposed to the inside of the fuselage 10. The end edges 31A of the inner heat insulation material 31 may be cut smoothly, or may be formed smoothly by pressing with a die of a desired shape. The end edges 31A of the inner heat insulation material 31 can be formed smoothly by any other appropriate method.

The end edges 31A of the inner heat insulation material 31 adjacent to the region 10R are rising gently in the thickness direction of the inner heat insulation material 31.

In addition, the inner heat insulation material 31 continues smoothly, without becoming angular, from each end edge 31A to a surface 31S of the inner heat insulation material 31.

If the end edges 31A of the inner heat insulation material 31 are formed smoothly, air inside the fuselage 10 flows smoothly without stagnating in the region 10R. If the air flows smoothly, cold air is supplied to the region 10R, so that heat of the region 10R can be released efficiently.

Figure 4B:
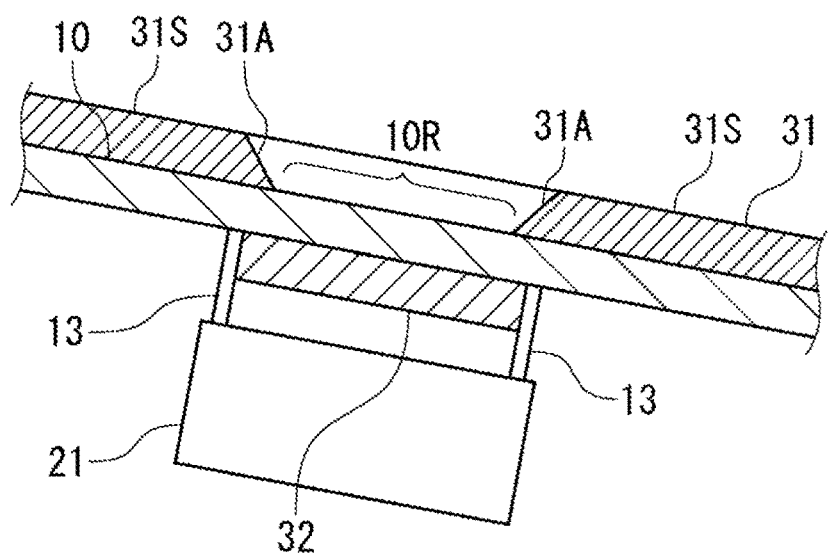
FIG. 4B is a cross-sectional view showing a modified example of the second embodiment.

While the inner heat insulation material 31 shown in FIG. 4A has a curvature from each end edge 31A to the surface 31S of the inner heat insulation material 31, it is also acceptable to form the inner heat insulation material 31 so that each end edge 31A and the surface 31S of the inner heat insulation material 31 form an obtuse angle as shown in FIG. 4B. In this case, too, since the end edges 31A are rising gently and the edginess of the end edges 31A which hinders the flow of surrounding air are eased, heat of the region 10R is released efficiently.

Third Embodiment

Next, a third embodiment of the present invention will be described with reference to FIG. 5.

In the third embodiment, an air current Ac as a cooling source is supplied from the inside of the fuselage 10 toward the region 10R exposed to the inside of the fuselage 10.

For example, air conditioning exhaust, which circulates inside the pressurized compartment 12 as air conditioning air produced by the air conditioning system 20 and is thereafter discharged to the outside of the aircraft through the inside of the fairing 11, can be used as the air current Ac. For this purpose, a duct 16 can be routed from a compartment or a pipeline, where the air conditioning exhaust flows, toward the region 10R.

Otherwise, low-temperature air taken out from the air cycle of the air conditioning pack 21 can also be supplied as the air current Ac to the region 10R.

Even if the temperature of the air current Ac is similar to the temperature of air inside the fuselage 10 present around the region 10R, as the flow of air around the region 10R is promoted by the air current Ac flowing out of the duct 16, heat release from the region 10R can be promoted.

This embodiment can achieve a required cooling effect by supplying the air current Ac to the inside of the fuselage 10, even in a case where the heat blocking effect of the outer heat insulation material 32 cannot be exerted sufficiently due to a constraint on the region of the outer circumferential part of the fuselage 10 in which the outer heat insulation material 32 can be provided.

Examples of the case where there is a constraint on the region in which the outer heat insulation material 32 can be provided include a case where the outer heat insulation material 32 and the support member 13 for supporting the air conditioning pack 21 interfere with each other.

Figure 5:
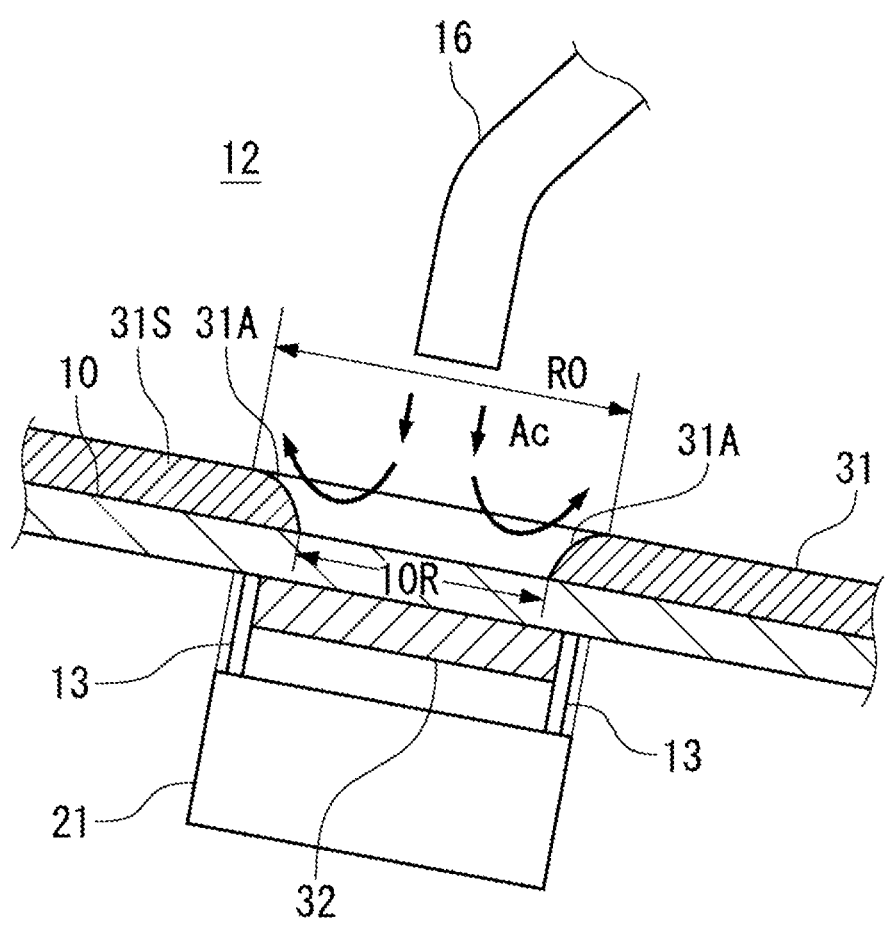
FIG. 5 is a cross-sectional view showing a cooling structure in a third embodiment.

In such cases, as shown in FIG. 5, even if the outer heat insulation material 32 can be disposed only in a region narrower than the projection area RO of the air conditioning pack 21, the cooling effect required for suppressing the temperature rise of the region 10R can be achieved.

The flow rate of the air current Ac supplied through the duct 16 can be determined on the basis of the required cooling effect.

This embodiment, which utilizes the air conditioning exhaust from the pressurized compartment 12, meets the constraint on the weight of the aircraft 1, since it requires only installation of the duct 16 and does not require installation of a separate cooling device.

In this embodiment, the required cooling effect can be achieved even when the end edges 31A of the inner heat insulation material 31 are not formed smoothly, as the flow of air around the region 10R is promoted by supply of the air current Ac.

Fourth Embodiment

Figure 6:
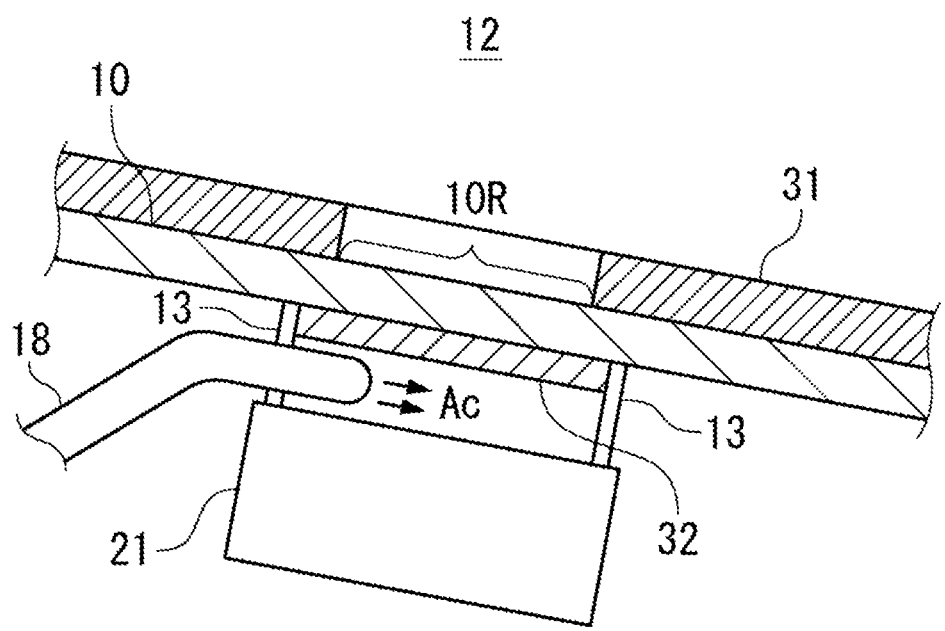
FIG. 6 is a cross-sectional view showing a cooling structure in a fourth embodiment.

Next, a fourth embodiment of the present invention will be described with reference to FIG. 6.

In the fourth embodiment, the air current Ac is supplied through a duct 18 to the space between the lower part 10A of the fuselage 10 and the fairing 11.

The outlet of the duct 18 is preferably disposed near the corresponding region 10R. In this embodiment, air is blown from the duct 18 into the space between the outer heat insulation material 32 and the air conditioning pack 21.

As in the third embodiment, air conditioning exhaust, or low-temperature air taken out from the air cycle of the air conditioning pack 21, can be used as the air current Ac.

The flow of air inside the fairing 11 is promoted by the air current Ac flowing out of the duct 18. As a result, heat release to the surface of the fairing 11 is promoted, so that the air conditioning pack 21 and the region 10R of the fuselage 10 can be cooled accordingly.

As with the third embodiment, this embodiment can achieve a required cooling effect by supplying the air current Ac, even in a case where the heat blocking effect of the outer heat insulation material 32 cannot be exerted sufficiently due to a constraint on the region of the outer circumferential part of the fuselage 10 in which the outer heat insulation material 32 can be installed.

Fifth Embodiment

Figure 7:
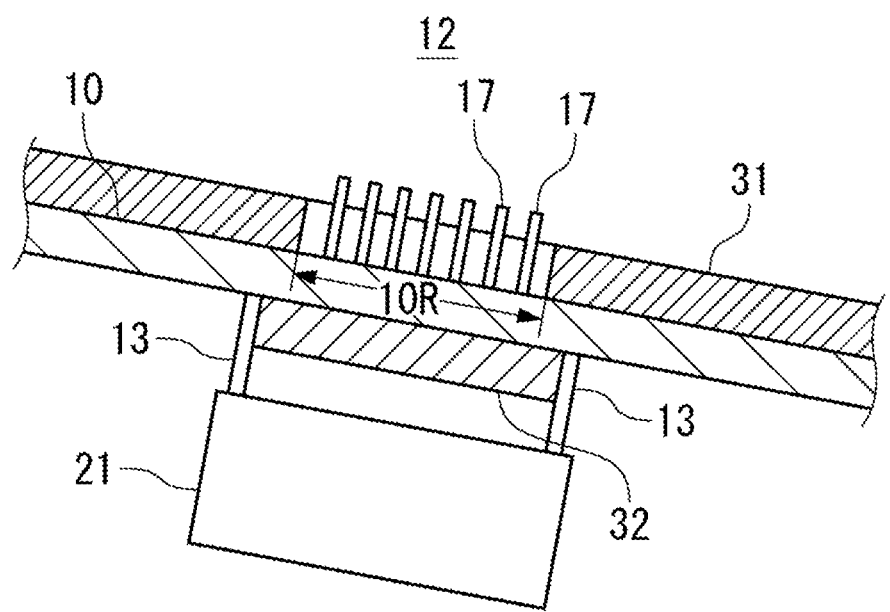
FIG. 7 is a cross-sectional view showing a cooling structure in a fifth embodiment.

Next, a fifth embodiment of the present invention will be described with reference to FIG. 7.

In the fifth embodiment, the surface area of the region 10R in contact with the air on the inside of the fuselage 10 is increased by a plurality of fins 17 which are provided in the region 10R of the fuselage 10 so as to protrude toward the inside of the fuselage 10. Heat of the region 10R can be released efficiently for the amount of the surface area increased by these fins 17.

The above-described first to fifth embodiments can be combined with one another.

Otherwise, the configurations presented in the above embodiments can be selectively adopted or appropriately modified into other configurations within the scope of the present invention.

In the present invention, as long as a channel through which heat attributable to the heat generation part propagates from the outside of the fuselage to the inside is secured, the inner heat insulation material and the outer heat insulation material can be disposed at appropriate positions of the fuselage.

For example, a configuration is also acceptable in which the inner heat insulation material 31 is disposed in a part of the inside of the region 10R in addition to the surrounding area of the region 10R corresponding to the heat generation part, as long as heat is released from the portion of the region 10R where the inner heat insulation material 31 is not disposed.

In the present invention, it is acceptable to additionally use a cooling device, which cools the heat generation part and the fuselage structure, within constraints on the space and the weight of the aircraft.

What is claimed is:

1. An aircraft comprising:
    a fuselage;
    a heat generation part installed on an outside circumferential surface of the fuselage, the heat generation part positioned adjacent a corresponding region of the fuselage, the corresponding region having a first shape;
    a fairing covering the heat generation part;
    an inner heat insulation material disposed on an internal circumferential surface of the fuselage;
    an aperture formed in the inner heat insulation material, the aperture being aligned with the corresponding region of the fuselage; and
    an outer heat insulation material disposed on the outside circumferential surface of the fuselage and adjacent to the corresponding region of the fuselage.

2. The aircraft according to claim 1, further comprising an air conditioning system, wherein air conditioned by the air conditioning system is present at least in a space adjacent to the aperture, the space being inside of the fuselage.

3. The aircraft according to claim 1, wherein the corresponding region is exposed toward the inside of the fuselage via the aperture.

4. The aircraft according to claim 1, wherein the inner heat insulation material and the outer heat insulation material are disposed such that the inner and outer heat insulation materials, together, cover an entire circumference of the fuselage without interruption.

5. The aircraft according to claim 1, wherein end edges of the inner heat insulation material and the outer heat insulation material overlap each other.

6. The aircraft according to claim 1, wherein the first shape of the corresponding region is defined over a first area, the first area being substantially equal to a second area of the heat generation part projected along the thickness direction of the fuselage.

7. The aircraft according to claim 1, wherein the first shape of the corresponding region is defined over a first area, the first area being larger than a second area of the heat generation part projected along the thickness direction of the fuselage.

8. The aircraft according to claim 1, wherein end edges of the inner heat insulation material define the aperture formed in the inner heat insulation material, the end edges rising gently in a thickness direction of the inner heat insulation material.

9. The aircraft according to claim 8, wherein the inner heat insulation material has a curvature from each of the end edges to a surface of the inner heat insulation material.

10. The aircraft according to claim 8, wherein the inner heat insulation material is formed so that each of the end edges and a surface of the inner heat insulation material form an obtuse angle.

11. The aircraft according to claim 1, wherein a flow of air is supplied from the inside of the fuselage toward the corresponding region.

12. The aircraft according to claim 1, wherein a flow of air is supplied to a space between the fuselage and the fairing.

13. The aircraft according to claim 1, wherein a surface area of the corresponding region in contact with air within the fuselage is increased by a protrusion formed in the corresponding region.

14. The aircraft according to claim 1, wherein the outer heat insulation material is fitted on the outside circumferential surface of the fuselage through a hook-and-loop fastener having hooks and loops engaging with each other.

15. A fuselage cooling structure of an aircraft having a fuselage and a heat generation part disposed adjacent to a corresponding region of the fuselage, the fuselage cooling structure comprising:
an inner heat insulation material disposed on an internal circumferential surface of the fuselage;
an aperture formed in the inner heat insulation material, the aperture being aligned with the corresponding region of the fuselage; and
an outer heat insulation material disposed on an outside circumferential surface of the fuselage and adjacent to the corresponding region, the outer heat insulation material being covered by a fairing.

16. The aircraft according to claim 1, wherein the aperture has a second shape that corresponds to the first shape.

17. The aircraft according to claim 1, wherein the corresponding region, the heat generation part, the aperture, and the outer heat insulation material are all radially aligned with respect to a central axis of the fuselage.

* * * * *